(12) United States Patent
Fukunaga (10) Patent No.: US 6,371,236 B1
(45) Date of Patent: Apr. 16, 2002

(54) VEHICLE FRAME STRUCTURE OF MOTORCYCLE

(75) Inventor: Hirofumi Fukunaga, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/539,377

(22) Filed: Mar. 31, 2000

(30) Foreign Application Priority Data

Mar. 31, 1999 (JP) .......................................... 11-090537

(51) Int. Cl.⁷ .............................................. B62D 61/02
(52) U.S. Cl. ...................... 180/219; 280/281.1; 280/284
(58) Field of Search ................................ 180/218, 219, 180/228, 221, 227; 280/281.1, 283, 284, 288

(56) References Cited

U.S. PATENT DOCUMENTS

| | | | | |
|---|---|---|---|---|
| 4,087,109 A | * | 5/1978 | Davis | 280/284 |
| 4,660,854 A | * | 4/1987 | Suzuki et al. | 280/782 |
| 4,706,774 A | * | 11/1987 | Tsuboi | 180/227 |
| 5,012,883 A | * | 5/1991 | Hiramatsu | 180/225 |
| 5,377,776 A | * | 1/1995 | Saiki | 180/219 |
| 5,480,001 A | * | 1/1996 | Hara | 180/227 |
| 5,749,591 A | * | 5/1998 | Thurm | 280/284 |
| 6,142,498 A | * | 11/2000 | Smith | 280/281.1 |

FOREIGN PATENT DOCUMENTS

JP   62-238180   10/1987

* cited by examiner

*Primary Examiner*—Anne Marie Boehler
*Assistant Examiner*—Tony Winner
(74) *Attorney, Agent, or Firm*—Birch, Stewart, Kolasch & Birch, LLP (57) ABSTRACT

A more rigid front and rear half sections of the frame that easily sets the joint rigidity of the rear half section of the frame with respect to the front half section of the frame. A vehicle frame of a motorcycle includes a pair of right and left main frames extending towards the rear from the head pipe, a lower cross member mounted between the rear ends of the right and left main frames, one center frame extended downwardly from the lower cross member, and an engine mounting bracket jointed to the lower end of the center frame. The center frame is provided with a pivot, to which the rear swing arm is vertically swingably attached.

34 Claims, 7 Drawing Sheets

VEHICLE FRAME STRUCTURE OF MOTORCYCLE

BACKGROUND OF THE INVENTION

1. Field of the Invention

The present invention relates to improvements in the vehicle frame of a motorcycle.

2. Description of Background Art

A vehicle frame of a motorcycle is disclosed in Japanese Patent Laid-Open No. Sho 62-238180. This vehicle frame, according to FIG. 2 and FIG. 3, includes a frame 2 including a pair of right and left main pipes 202, 202 extended downward toward the rear from a head tube 201 (reference numerals cited herein are from the above-described Japanese Patent Laid-Open publication), right and left lower members 208, 208 extend from the rear end of the main pipes 202, 202, and rear fork pivots 208a, 108a are provided on the right and left lower members 208, 208.

The frame 2 is provided with one down tube 211 extended downward from the head tube 201, two front and rear cross members 203 and 205 between the right and left main pipes 202, 202, and a cross member 209 between the right and left lower members 208, 208.

Furthermore, in the prior art, according to FIGS. 1 and 2 of this publication, an engine is mounted on the right and left main pipes 202, 202, right lower members 208, 208, and the down tube 211; and the front end of the rear fork 10 (corresponding to the rear swing arm) is vertically swingably attached.

Road rebound acting on the rear wheel 6 is transmitted to the right and left main pipes 202, 202 through the rear fork 10, the rear fork pivots 208a, 208a, and the lower members 208, 208.

Generally, the front half section of the frame which includes the head tube 201, the right and left main pipes 202, 202, and the two front and rear cross members 203 and 205 has substantial rigidity. The front half section of the frame forms a main body section of the frame, which receives the weight of the engine suspended thereon, and a fuel tank 4 and a seat 5 mounted thereon, and receives rebound from the road surface during travel.

In the meantime, the rear half section (the rear fork section) of the frame includes the rear fork 10, the lower members 208, 208, the rear fork pivot portions 208a, 208a, and the cross member 209 also has necessary rigidity.

During a turn or banking, a horizontal force acts on the frame 2 of the motorcycle. With the drivability of the motorcycle taken into account, the frame 2 is more desirable to have some degree of flexibility in relation to the lateral load. It is convenient therefore to set, by each vehicle model, the optimum value of the rigidity (connection rigidity) of the portion where the front half section of the frame and the rear half section of the frame are connected.

According to the prior art, therefore, the right and left lower members 208, 208 are jointed for connection to the right and left main pipes 202, 202; to set the connection rigidity, it becomes imperative to change the rigidity of the front half section of the frame and the rigidity of the rear half section of the frame. Therefore, it is not easy to set proper connection rigidity according to the vehicle model.

SUMMARY AND OBJECTS OF THE INVENTION

The present invention, therefore, has as an object the provision of the vehicle frame of a motorcycle that is capable of ensuring the rigidity of the front half section and the rear half section of the frame, and also easily setting the connection rigidity of the rear half section of the frame with respect to the front half section of the frame.

To accomplish the above-described object, according to the present invention, a pair of right and left main frames extend from the head pipe toward the rear; a cross member is provided between the rear ends of the right and left main frames; one center frame extends downward from the cross member; at the lower end of the center frame, an engine mounting lower bracket is jointed; and a swing arm pivot is provided on the center frame or the lower bracket.

The front half section of the frame including the head pipe, right and left main frame, and lower cross member has great rigidity. In the meantime, the rear half section of the frame consisting of the center frame, swing arm pivot, and rear swing arm to be attached to the pivot also has necessary rigidity. It is possible to set a proper connection rigidity of the rear half section of the frame in relation to the front half section of the frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the accompanying drawings, the preferred embodiment of the vehicle frame of a motorcycle will be explained.

The "front," "rear," "left," "right," "upper" and "lower" designations used herein refer to orientations with respect to the driver; in the drawings, Fr denotes front side; Rr, rear side; L, left side; R, right side; and CL, centerline of the vehicle frame (the center of vehicle width). The drawings should be viewed in the direction of the reference numerals.

Figure 1:
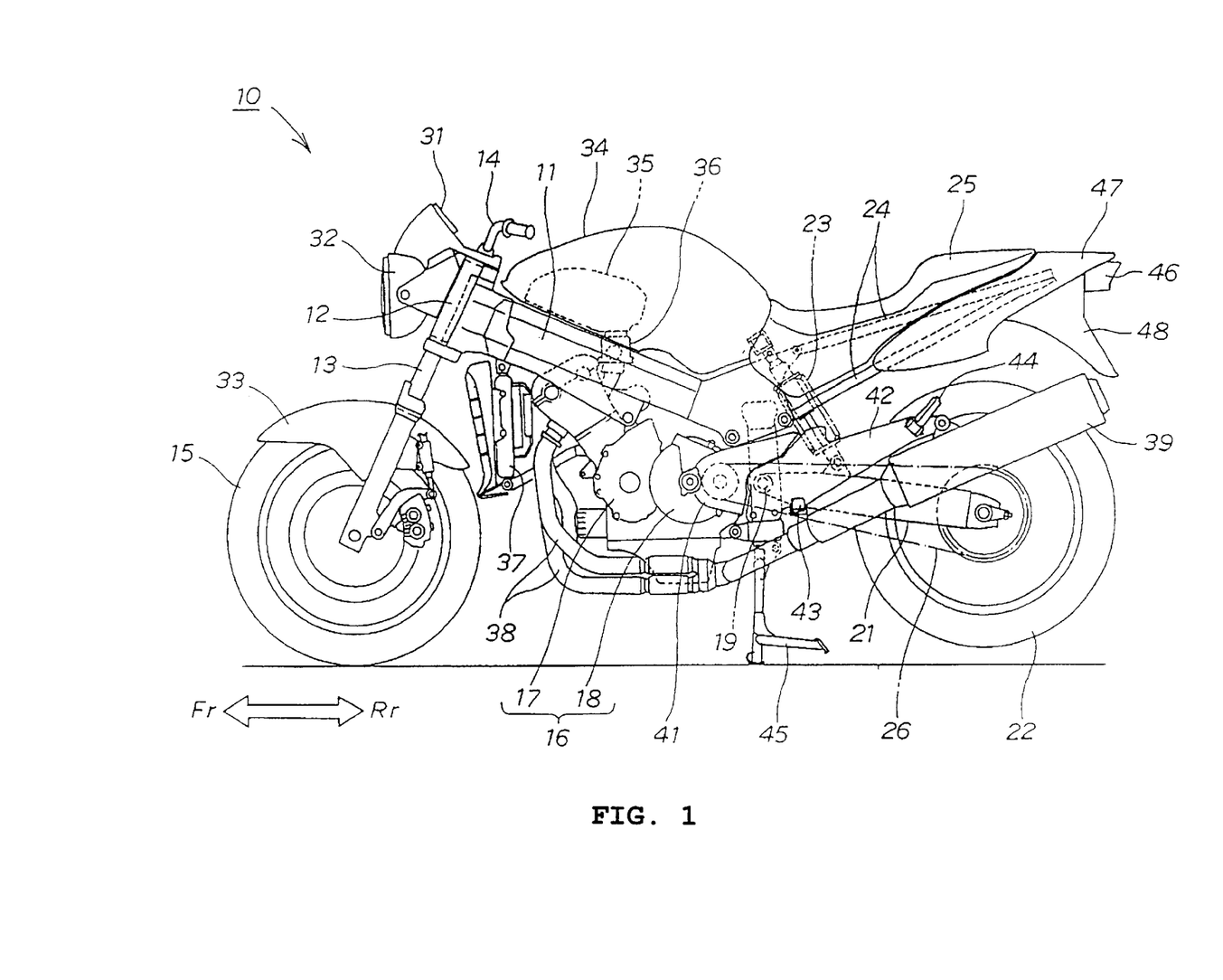
FIG. 1 is a left side view of a motorcycle according to the present invention.

FIG. 1 is the left side view of a motorcycle according to the present invention. The motorcycle 10 includes as major components a vehicle frame 11, a front fork 13 attached to a head pipe 12 of the vehicle frame 11, a handlebar 14 connected to the upper part of the front fork 13, a front wheel 15 attached to the lower part of the front fork 13, a power unit 16 (an assembly of an engine 17 at the front and a transmission 18 at the rear) mounted on the front lower part of the vehicle frame 11, a rear swing arm (rear fork) 21 attached to a swing arm pivot 19 provided on the rear lower part of the vehicle frame 11, a rear wheel 22 attached to a rear swing arm 21, a rear suspension 23 suspending the rear swing arm 21 at the rear upper part of the vehicle frame 11, and a seat 25 attached to the rear upper part of the vehicle frame 11 through a seat rail 24. The rear wheel 22 is driven by the power from the power unit 16 through a drive chain 26.

The engine 17 is a water-cooled four-cylinder engine tilted forward and upward, the case of which serves also as the transmission case.

The drawings illustrate, an instrument cluster 31; a headlamp 32; a front fender 33; a fuel tank 34; an air cleaner 35; a carburetor 36; a radiator 37; an exhaust pipe 38; a muffler 39; a side cover 41; a footrest bracket 42; a driver footrest 43; a pillion footrest 44; a main stand 45; a tail lamp 46; a rear cover 47; and a rear fender 48.

Figure 2:
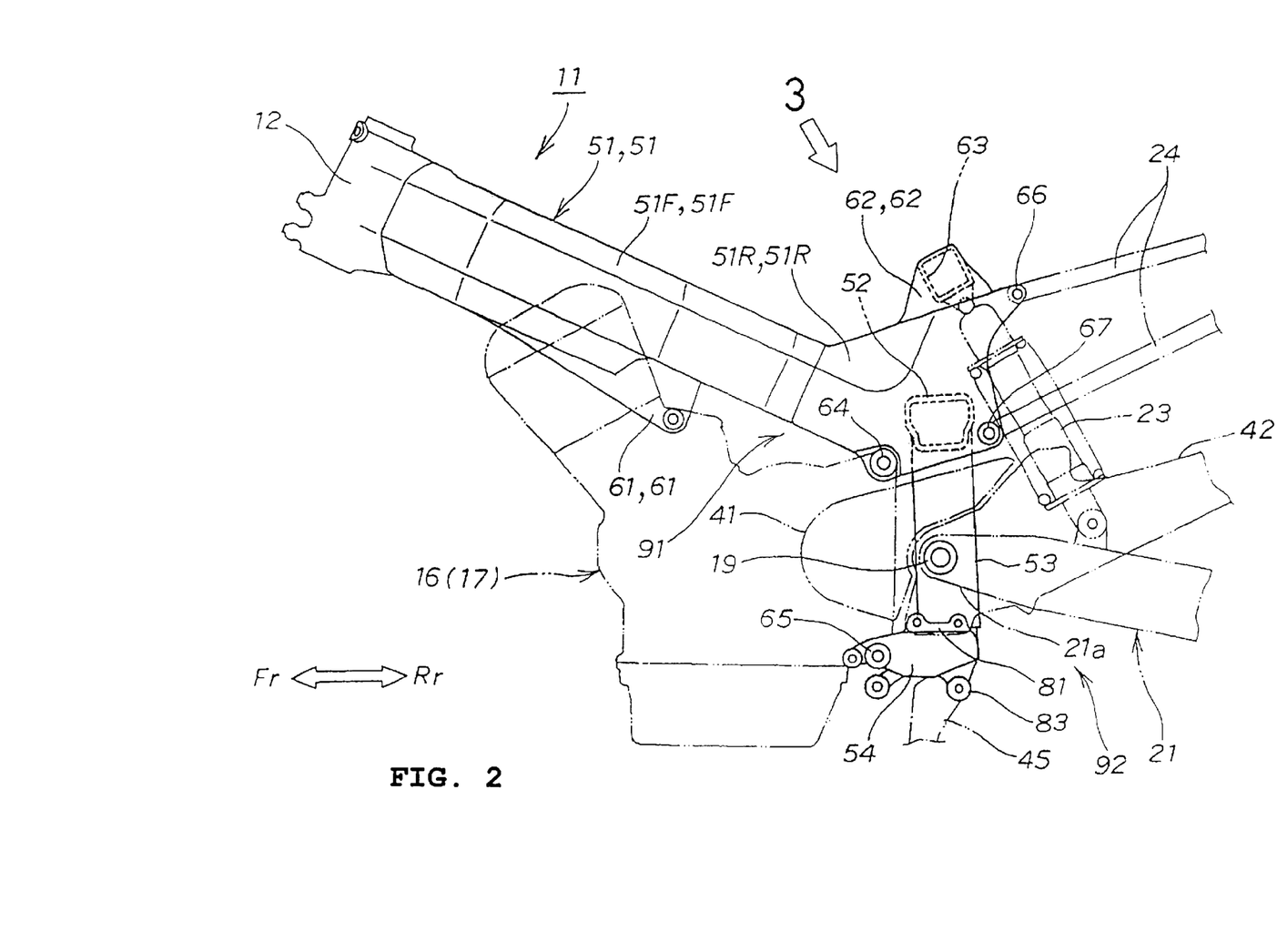
FIG. 2 is a left side view of a vehicle frame according to the present invention.

FIG. 2 is a left side view showing the vehicle frame of the present invention. The frame 11 is an approximately inverted L-shaped frame in a side view comprising, as major components, the head pipe 12, a pair of right and left main frames 51, 51 (in this drawing, only one main frame on this side is shown) extending rearwardly from the head pipe 12, a cross member 52 located in the lower part (hereinafter referred to as the lower cross member 52) between the rear ends of the right and left main frames 51, 51, a center frame 53 located below the lower cross member 52, and an engine mounting lower bracket 54 jointed at the lower end of the center frame 53.

To be more specific, the main frame 51 includes a front frame portion 51F made of a square pipe jointed at the front end to the head pipe 12, and a rear frame portion 51R jointed to the rear end of the front frame portion 51F.

The right and left front frame portions 51F, 51F are jointed at the lower surface to hanger portions 61, 61. Overhanging portions 62, 62 are formed locally in the upper part of the right and left rear frame portions 51R, 51R, and between these overhanging portions 62, 62 a cross member 63 (hereinafter referred to as the upper cross member 63) is provided.

The head pipe 12 and the rear frame portion 51R are made, for example, from aluminum castings; and the front frame portion 51F and the upper and lower cross members 63 and 52 are made, for example, by extrusion molded parts of aluminum square pipe. These members are mutually jointed by welding.

The center frame 53 is provided with the swing arm pivot 19, to which the front end of the rear swing arm 21 indicated by a phantom line is vertically swingably attached.

The front half section 91 of the frame including the head pipe 12, the right and left frames 51, 51, and the lower cross member 52, has substantially great rigidity. In the meanwhile, the rear half section 92 of the frame including the center frame 53, the pivot 19 provided on the center frame 53, and the rear swing arm 21 attached on the pivot 19 also has as great rigidity as required.

Furthermore, this drawing shows the following points (1) to (3).

(1) The power unit 9 indicated by a phantom line is mounted on the hanger portion 61, the hanger portion 64 of the rear frame portion 51R, and the hanger portion 65 of the engine mounting lower bracket 54.

(2) The upper end portion of the rear suspension 23 is vertically swingably attached to the upper cross member 63. And the rear swing arm 21 indicated by a phantom line is also vertically swingably attached to the lower end portion of the rear suspension 23.

(3) The seat rail 24 indicated by a phantom line is attached to the rear brackets 66 and 67 of the rear frame section 51 R.

Figure 3:
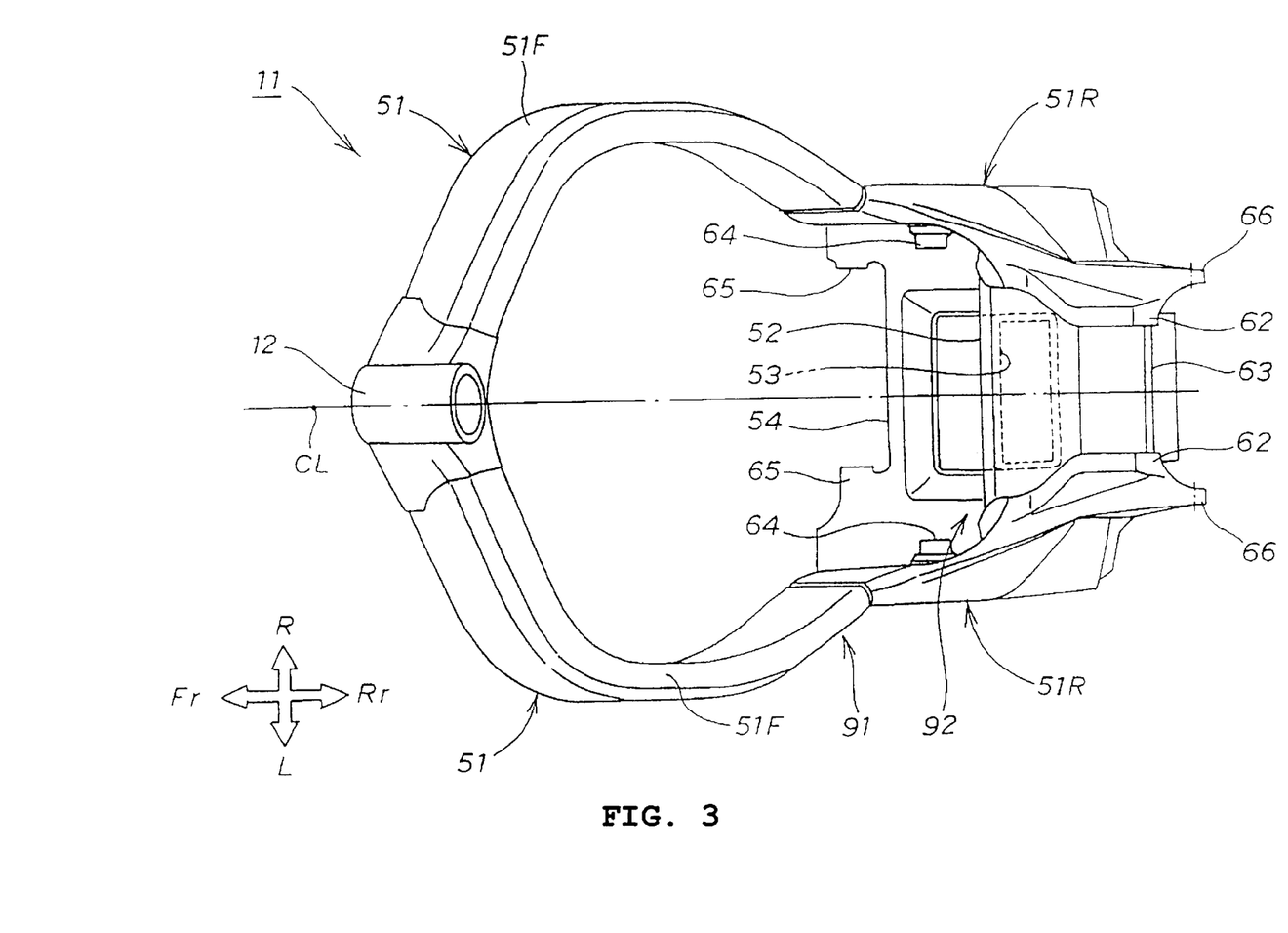
FIG. 3 is a view seen from the arrow 3 of FIG. 2.

FIG. 3 is a perspective view seen from the arrow 3 in FIG. 2, showing that (1) the upper and lower cross members 63 and 52 are mounted between the rear ends of the pair of right and left main frames 51, 51; (2) the center frame 53 is arranged on the vehicle frame centerline CL; and (3) the center frame 53 is a wide square pipe as viewed in a plan.

Figure 4:
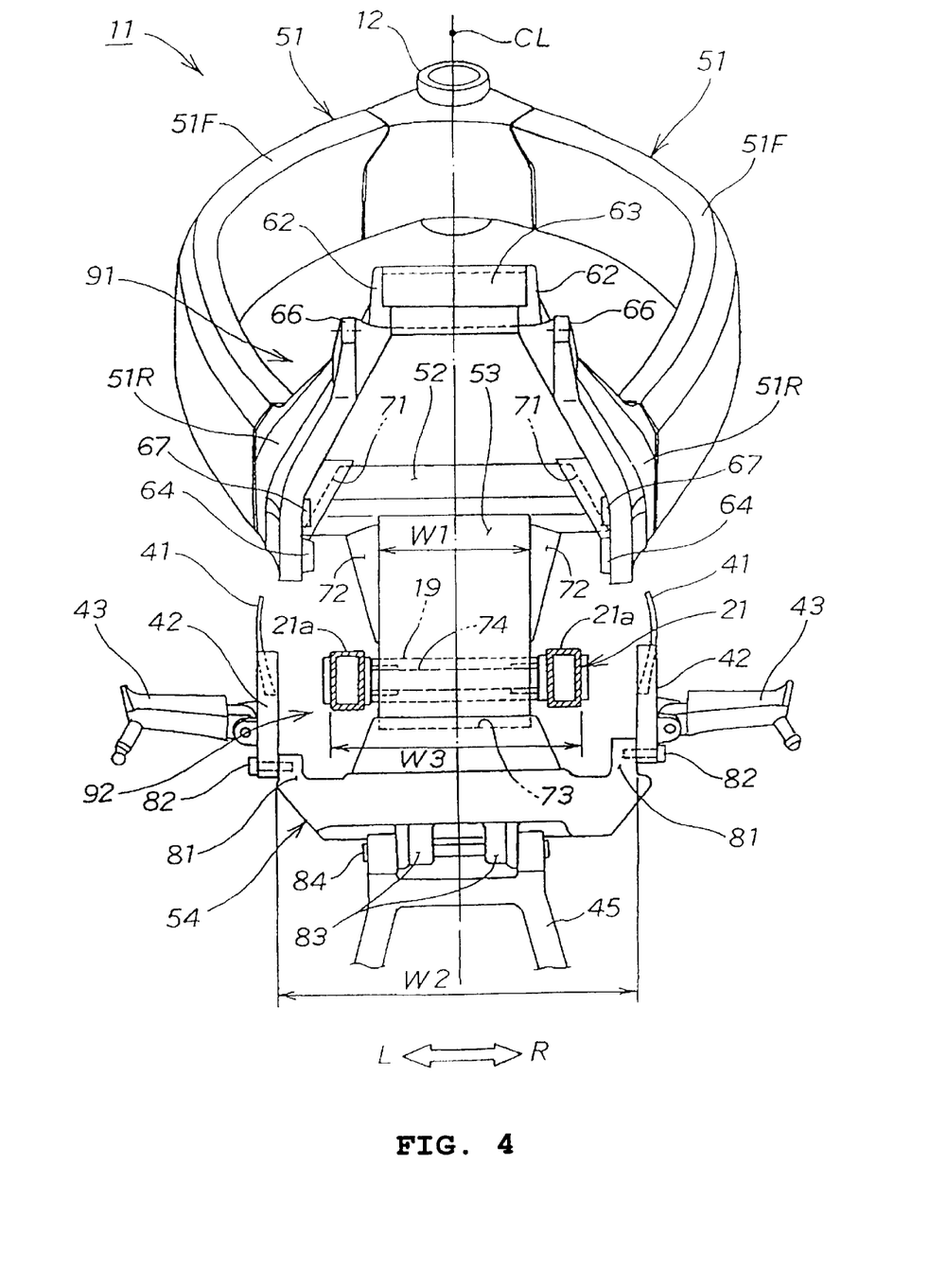
FIG. 4 is a rear view of the vehicle frame according to the present invention.

FIG. 4 is a rear view of the vehicle frame of the present invention. The right and left rear frame portions 51R, 51R have mutually opposite fitting recesses 71, 71, in which both ends of the lower cross member 52 are fitted and jointed.

The lower cross member 52 is of such a configuration that the upper end of the center frame 53 is jointed to the lower cross member 53 and the corner portion thus jointed to the center frame 53 is reinforced with the right and left gussets 72, 72. The center frame 53 is fitted at the lower end in the fitting recess 73 of the lower bracket 54, and further a tubular pivot 19 is laterally inserted and jointed at the midpoint of the lengthwise direction (at the midpoint of the height). The pivot 19 is attached at the right and left front portions 21a, 21a of the rear swing arm 21 by a pivot shaft 74.

The lower bracket 54 has the right and left footrest brackets 42, 42, which are attached by bolts 82, 82 to the side of the right and left upper bracket sections 81, 81. The main stand 45 is also attached by a bolt 84 to the right and left lower bracket sections 83, 83.

The center frame 53, as stated above, is a single vertically long frame member arranged past the vehicle frame centerline CL to thereby connect the lower cross member 52 to the lower bracket 54. The width W1 of the center frame 53 viewed from the back is less than either of the length of the lower cross member 52 and the width of the lower bracket 54. As a result, the width W1 of the center frame 53 is less than the width W2 between the right and left upper bracket sections 81, 81. The width W3 of the front part of the rear swing arm 21 attached to the pivot 19 is also smaller than the width W2. The center frame 53 thus configured is attached to both sides of the right and left upper bracket sections 81, 81. The distance between the footrest brackets 42, 42 mounted on both sides of the right and left upper bracket sections 81, 81 is the same as the width W2. Furthermore, in the rear view shown in the drawing, the right and left side covers 41, 41 pass outside of the right and left upper bracket sections 81, 81.

Therefore, the right and left side covers 41, 41 and the right and left footrest brackets 42, 42 cover the pivot 19 and both the right and left sides of the front portions 21a, 21a of the rear swing arm 21, thereby to conceal these portions from outside and accordingly to improve the appearance of the motor vehicle. This is clearly shown also in FIG. 2.

Figure 5:
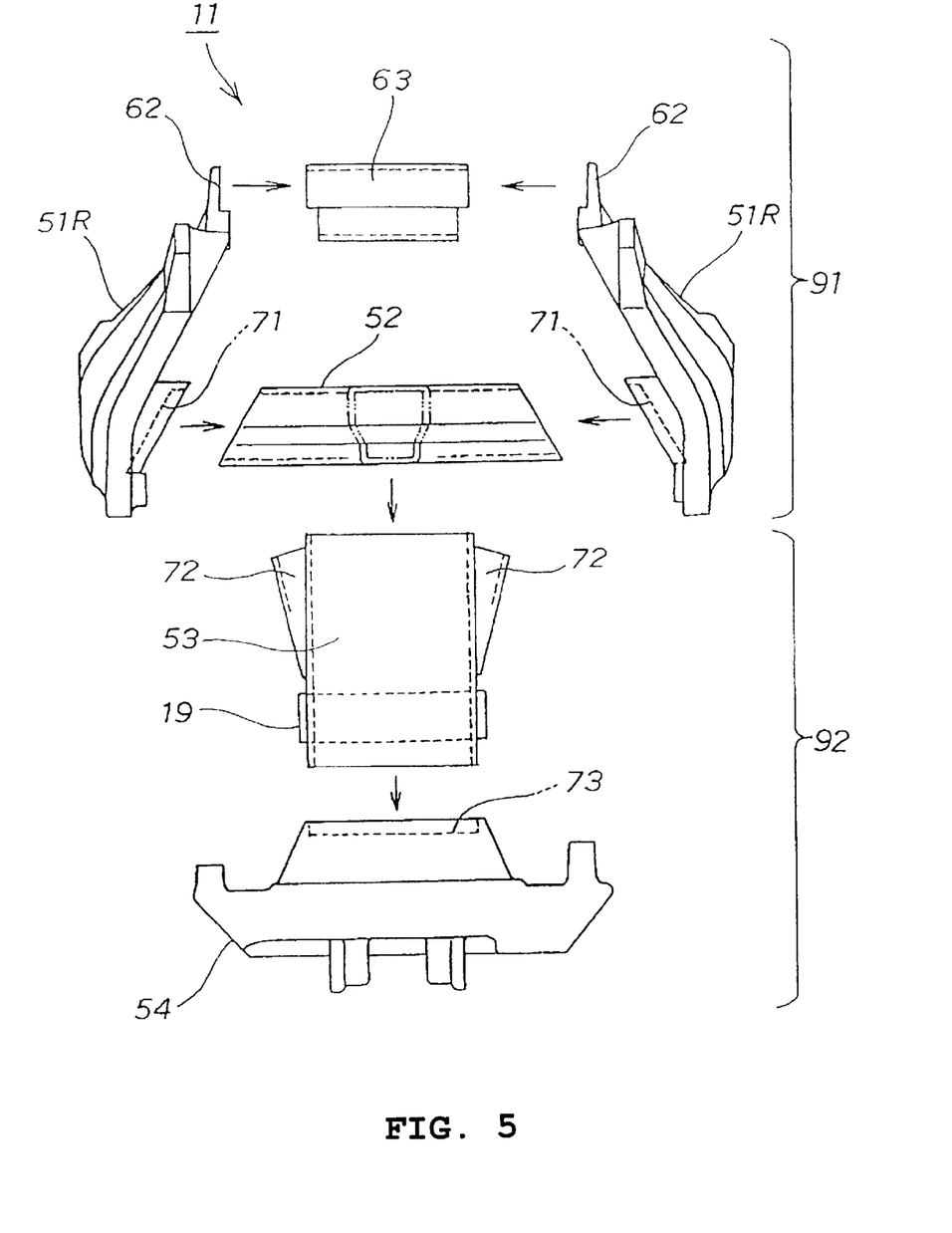
FIG. 5 is an exploded rear view of the vehicle frame according to the present invention.

FIG. 5 is a exploded rear view of the vehicle frame pertaining to this invention, which shows a relationship among the right and left rear frame portions 51R, 51R, the lower and upper cross members 52 and 63, the center frame 53, the lower bracket 54, and the pivot 19.

The assembling procedure of the rear section of the vehicle frame 11 is as follows. It is to be noted that this procedure is explained for easy understanding of the above-described configuration, but is not limited thereto.

(1) Both ends of the lower cross member 52 are fitted in and welded to the fitting recesses 71, 71 of the right and left rear frame portions 51R, 51R.

(2) Subsequently, the upper cross member 63 is welded with its both ends set between the right and left overhanging portions 62, 62.

(3) Subsequently, the upper and of the center frame 53 and the right and left gussets 72, 72 are welded to the lower cross member 52.

(4) Finally, the lower end of the center frame 53 is fitted in and welded to the fitting recess 73 of the lower bracket 54, thus completing the procedure.

Figure 6A:
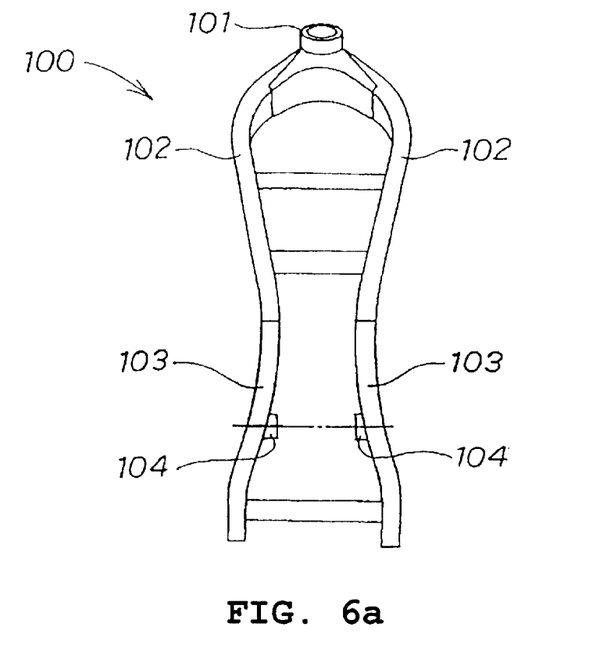
FIGS. 6a–6c are explanatory views of the vehicle frame according to the present invention.
Figure 6B:
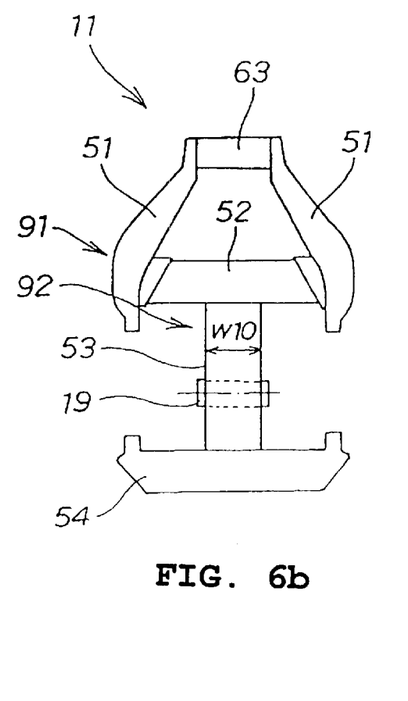
Figure 6C:
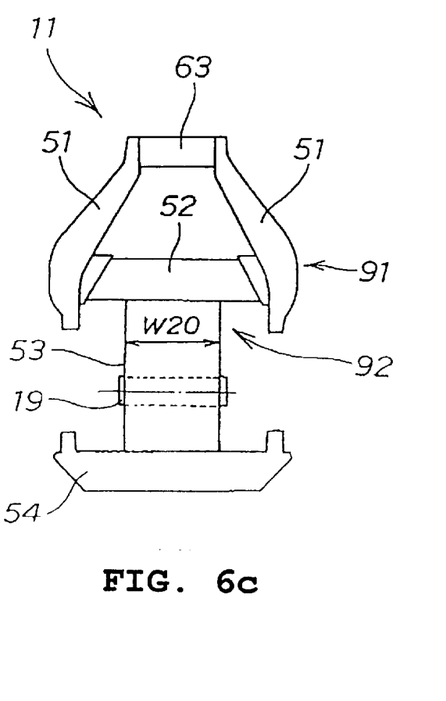

FIGS. 6A to 6C are explanatory views of the vehicle frame according to the present invention.

FIG. 6A gives a comparison example, showing a schematic rear structure of the prior art vehicle frame (Japanese Patent Laid-Open No. Sho 62-238180). Reference numerals and designations in this drawing differ from those of the prior art.

In the comparison example, the vehicle frame 100 includes a pair of right and left main frames 102, 102 extended toward the rear (to this side in the drawing) from the head pipe 101, right and left lower members 103, 103 extended downward from the rear end of the right and left main frames 102, 102, swing arm pivots 104, 104 provided on the right and left lower members 103, 103, and an unillustrated rear swing arm attached to the pivots 104, 104. Because the right and left lower members 103, 103 are connected by jointing to the right and left main frames 102, 102, the rigidity of the vehicle frame 100 can not easily be set to a proper value according to a vehicle model.

FIG. 6B shows a schematic rear structure (Example 1) of the vehicle frame according to the present invention. When reducing the joint rigidity of the rear half section 92 of the frame with respect to the front half section 91 of the frame, the center frame 53 of the narrow width W10 having a little rigidity is jointed between the upper cross member 63 and the lower bracket 54 as shown in FIG. 6B.

FIG. 6C shows the schematic rear structure of the vehicle frame (Example 2) according to this invention. To increase the joint rigidity of the rear half section 92 of the frame with respect to the front half section 91 of the frame, the center frame 53 of wide width W20 having a great rigidity is jointed between the lower cross member 52 and the lower bracket 54.

According to the above-described configuration, it is possible to easily and mutually independently obtain the rigidity of the front half section 91 and the rear half section 92 of the frame. Besides, the joint rigidity of the center frame 53 with respect to the front half section 91 of the frame, that is, the joint rigidity of the center frame 53 with respect to the rear half section of the frame 92, can be set to the optimum value simply by changing the rigidity of one center frame 53, thereby increasing the degree of design freedom.

Figure 7:
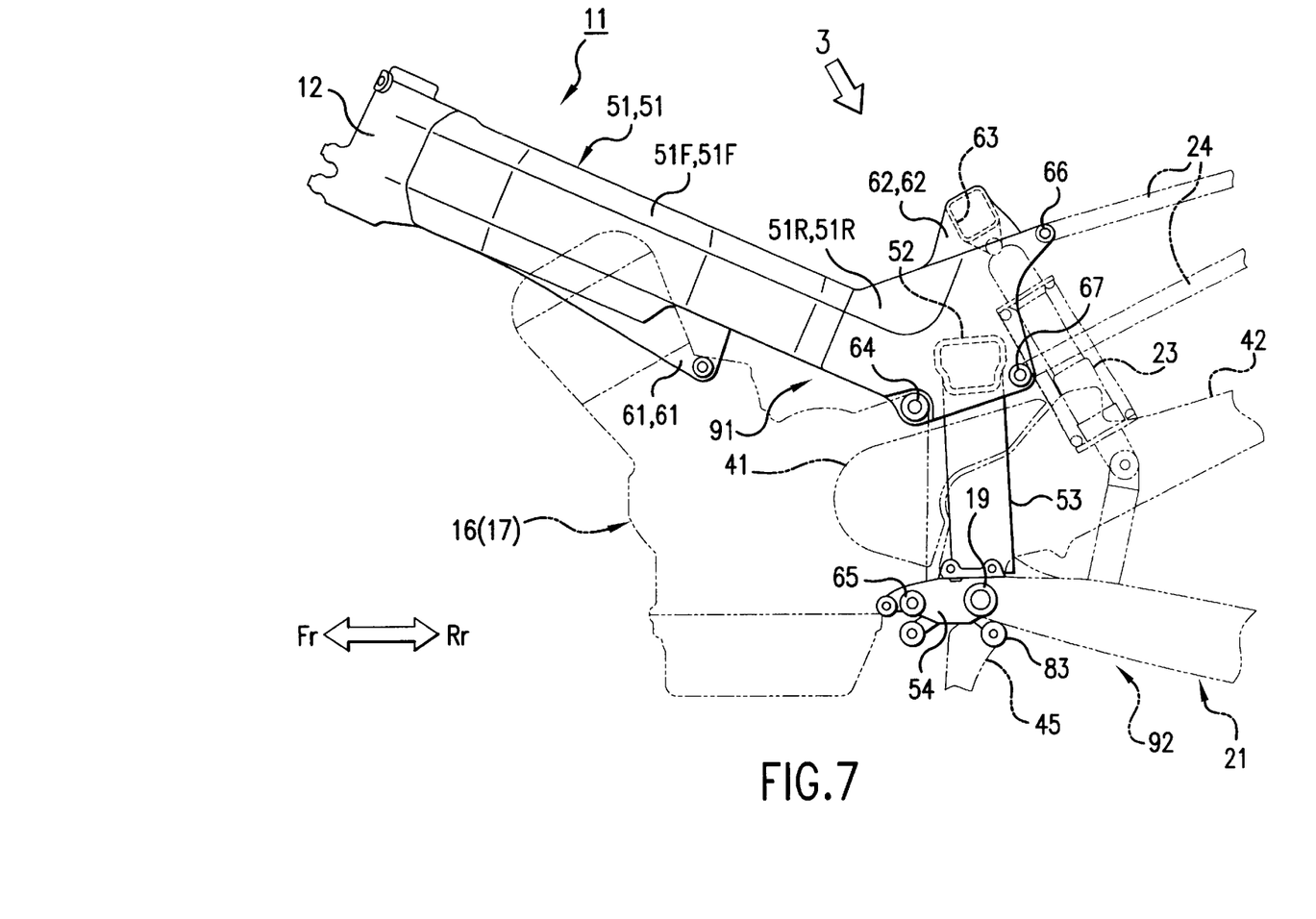
FIG. 7 is a left side view of a vehicle frame wherein the swing arm pivot is mounted on the lower bracket.

In the preferred embodiment of the present invention, as illustrated in FIG. 7, the swing arm pivot 19 may be mounted on the lower bracket 54. In this case, the rear half section 92 of the frame is comprised of the center frame 53, the lower bracket 54, the pivot 19 provided on the lower bracket 54 and the rear swing arm 21 attached to the pivot 19.

It is therefore possible to provide proper gussets 72, 72 by taking into account the joint rigidity of the rear half section 92 of the frame with respect to the front half section 91 of the frame.

This invention has the following advantage because of the above-described configuration.

According to the present invention, the vehicle frame structure of a motorcycle comprises a pair of right and left main frames extended rearward from a head pipe; a cross member mounted between the rear ends of the right and left main frames; one center frame extended downward from the cross member; an engine mounting lower bracket jointed to the lower end of the center frame; and a swing arm pivot provided on the center frame or the lower bracket. Therefore, the front half section of the frame including the head pipe, right and left main frames, and lower cross member, is provided with substantially great rigidity. Furthermore, the rear half section of the frame including the center frame, swing arm pivot, and rear swing arm attached to the pivot, is also provided with rigidity required for this section. Besides, it is possible to easily set, with a high degree of design freedom, the optimum joint rigidity of the rear half section of the frame with respect to the front half section of the frame by each vehicle model simply by altering the rigidity of one center frame.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle frame structure of a motorcycle, comprising:
    a pair of right and left main frames extending rearwardly from a head pipe;
    a cross member mounted between the rear ends of the right and left main frames;
    a single center frame extending downwardly from the cross member, said center frame being a wide square pipe in cross section;
    an engine mounting lower bracket joined to the lower end of the center frame; and
    a swing arm pivot mounted on said center frame.

2. The vehicle frame structure of a motorcycle according to claim 1, and further including a rear suspension operatively positioned between cross member and said swing arm for biasing said cross member and said swing arm relative to each other.

3. The vehicle frame structure of a motorcycle according to claim 1, and further including a seat rail operatively connected to extend from rear portions of said right and left main frames.

4. The vehicle frame structure of a motorcycle according to claim 1, wherein said right and left main frames are curved to form an opening for mounting an engine therebetween.

5. The vehicle frame structure of a motorcycle according to claim 1, wherein said cross member is fitted into and welded to fitting recesses on the right and left main frames for securing said cross member relative thereto.

6. The vehicle frame structure of a motorcycle according to claim 1, wherein the joint rigidity of the rear half section of the frame with respect to the front half section of the frame is increased by providing a center frame of an increased width jointed between the cross member and the lower bracket.

7. A vehicle frame structure of a motorcycle, comprising:
    a pair of right and left main frames extending rearwardly from a head pipe;
    a cross member mounted between the rear ends of the right and left main frames;
    a single center frame extending downwardly from the cross member, said center frame being a wide square pipe in cross section;

an engine mounting lower bracket joined to the lower end of the center frame; and a swing arm pivot mounted on said lower bracket.

8. The vehicle frame structure of a motorcycle according to claim 7, and further including a rear suspension operatively positioned between cross member and said swing arm for biasing said cross member and said swing arm relative to each other.

9. The vehicle frame structure of a motorcycle according to claim 7, and further including a seat rail operatively connected to extend from rear portions of said right and left main frames.

10. The vehicle frame structure of a motorcycle according to claim 7, wherein said right and left main frames are curved to form an opening for mounting an engine therebetween.

11. The vehicle frame structure of a motorcycle according to claim 7, wherein said cross member is fitted into and welded to fitting recesses on the right and left main frames for securing said cross member relative thereto.

12. The vehicle frame structure of a motorcycle according to claim 7, wherein the joint rigidity of the rear half section of the frame with respect to the front half section of the frame is increased by providing a center frame of an increased width jointed between the cross member and the lower bracket.

13. The vehicle frame structure of a motorcycle according to claim 1, and further including right and left footrest brackets mounted on the lower bracket.

14. The vehicle frame structure of a motorcycle according to claim 1, and further including a main stand attached to the lower bracket.

15. The vehicle frame structure of a motorcycle according to claim 7, and further including right and left footrest brackets mounted on the lower bracket.

16. The vehicle frame structure of a motorcycle according to claim 7, and further including a main stand attached to the lower bracket.

17. A vehicle frame structure of a motorcycle, comprising:

a pair of right and left main frames extending rearwardly from a head pipe;

a cross member mounted between the rear ends of the right and left main frames;

a single center frame extending downwardly from the cross member, said center frame includes right and left gussets for welding said center frame to said cross member;

an engine mounting lower bracket jointed to the lower end of the center frame; and a swing arm pivot mounted on said center frame.

18. The vehicle frame structure of a motorcycle according to claim 17, and further including a rear suspension operatively positioned between cross member and said swing arm for biasing said cross member and said swing arm relative to each other.

19. The vehicle frame structure of a motorcycle according to claim 17, and further including a seat rail operatively connected to extend from rear portions of said right and left main frames.

20. The vehicle frame structure of a motorcycle according to claim 17, wherein said right and left main frames are curved to form an opening for mounting an engine therebetween.

21. The vehicle frame structure of a motorcycle according to claim 17, wherein said cross member is fitted into and welded to fitting recesses on the right and left main frames for securing said cross member relative thereto.

22. The vehicle frame structure of a motorcycle according to claim 17, wherein the joint rigidity of the rear half section of the frame with respect to the front half section of the frame is increased by providing a center frame of an increased width jointed between the cross member and the lower bracket.

23. The vehicle frame structure of a motorcycle according to claim 17, wherein the center frame is a wide square pipe in cross section.

24. The vehicle frame structure of a motorcycle according to claim 17, and further including right and left footrest brackets mounted on the lower bracket.

25. The vehicle frame structure of a motorcycle according to claim 17, and further including a main stand attached to the lower bracket.

26. A vehicle frame structure of a motorcycle, comprising:

a pair of right and left main frames extending rearwardly from a head pipe;

a cross member mounted between the rear ends of the right and left main frames;

a single center frame extending downwardly from the cross member, said center frame includes right and left gussets for welding said center frame to said cross member;

an engine mounting lower bracket jointed to the lower end of the center frame; and a swing arm pivot mounted on said lower bracket.

27. The vehicle frame structure of a motorcycle according to claim 26, and further including a rear suspension operatively positioned between cross member and said swing arm for biasing said cross member and said swing arm relative to each other.

28. The vehicle frame structure of a motorcycle according to claim 26, and further including a seat rail operatively connected to extend from rear portions of said right and left main frames.

29. The vehicle frame structure of a motorcycle according to claim 26, wherein said right and left main frames are curved to form an opening for mounting an engine therebetween.

30. The vehicle frame structure of a motorcycle according to claim 26, wherein said cross member is fitted into and welded to fitting recesses on the right and left main frames for securing said cross member relative thereto.

31. The vehicle frame structure of a motorcycle according to claim 26, wherein the joint rigidity of the rear half section of the frame with respect to the front half section of the frame is increased by providing a center frame of an increased width jointed between the cross member and the lower bracket.

32. The vehicle frame structure of a motorcycle according to claim 26, wherein the center frame is a wide square pipe in cross section.

33. The vehicle frame structure of a motorcycle according to claim 26, and further including right and left footrest brackets mounted on the lower bracket.

34. The vehicle frame structure of a motorcycle according to claim 26, and further including a main stand attached to the lower bracket.

* * * * *